United States Patent
Oogami (10) Patent No.: US 11,089,204 B1
(45) Date of Patent: Aug. 10, 2021

(54) IMAGING DEVICE (71) Applicant: Panasonic Intellectual Property Management Co., Ltd., Osaka (JP)

(72) Inventor: Tomohiro Oogami, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/960,084

(22) PCT Filed: Jun. 19, 2019

(86) PCT No.: PCT/JP2019/024288
§ 371 (c)(1),
(2) Date: Jul. 5, 2020

(87) PCT Pub. No.: WO2020/158008
PCT Pub. Date: Aug. 6, 2020

(30) Foreign Application Priority Data

Jan. 31, 2019 (JP) .............................. JP2019-015772

(51) Int. Cl.
*H04N 5/232* (2006.01)

(52) U.S. Cl.
CPC ... *H04N 5/232127* (2018.08); *H04N 5/23216* (2013.01)

(58) Field of Classification Search
CPC ......... H04N 5/232127; H04N 5/23216; H04N 5/23218; H04N 5/232945; H04N 5/232; G03B 13/00
USPC .................................................... 348/333.01
See application file for complete search history.

(56) References Cited

U.S. PATENT DOCUMENTS

| | | | | |
|---|---|---|---|---|
| 7,702,231 B2* | 4/2010 | Sugimoto | .......... | G06K 9/00248 396/123 |
| 8,194,173 B2* | 6/2012 | Kawahara | .......... | H04N 5/23218 348/345 |
| 8,269,879 B2* | 9/2012 | Sugimoto | .......... | H04N 5/23251 348/349 |
| 8,421,905 B2* | 4/2013 | Sugimoto | .......... | H04N 5/23251 348/349 |
| 9,454,230 B2* | 9/2016 | Matsuki | .................. | G06F 3/016 |
| 10,205,869 B2* | 2/2019 | Mori | .................. | H04N 5/23216 |

(Continued)

FOREIGN PATENT DOCUMENTS

JP 2006-033437 A 2/2006

OTHER PUBLICATIONS

International Search Report for corresponding Application No. PCT/JP2019/024288, dated Sep. 10, 2019.

*Primary Examiner* — Pritham D Prabhakher
(74) *Attorney, Agent, or Firm* — Renner, Otto, Boisselle & Sklar, LLP (57) ABSTRACT

An imaging device includes a control unit that determines whether or not to operate a pre-autofocus function according to a setting state in which the pre-autofocus function is set to be valid or invalid, the pre-autofocus function adjusting a position of a focus lens to focus on the subject in the autofocus frame, regardless of whether the shutter button is half-pressed or not. In the control unit, when the position of the autofocus frame is changed using the first operation unit, the pre-autofocus function is operated regardless of the setting state, and when the position of the autofocus frame is changed using the second operation unit, the pre-autofocus function is operated according to the setting state.

4 Claims, 7 Drawing Sheets

(56) References Cited

U.S. PATENT DOCUMENTS

| | | | |
|---|---|---|---|
| 10,459,190 B2* | 10/2019 | Suzuki | G06T 7/11 |
| 2006/0012702 A1 | 1/2006 | Kawahara | |
| 2007/0018069 A1* | 1/2007 | Higashino | H04N 5/232945 |
| | | | 250/200 |
| 2007/0064145 A1* | 3/2007 | Sugimoto | G06K 9/00248 |
| | | | 348/345 |
| 2009/0135291 A1* | 5/2009 | Sugimoto | H04N 5/23218 |
| | | | 348/347 |
| 2009/0244357 A1* | 10/2009 | Huang | H04N 5/232127 |
| | | | 348/345 |
| 2012/0218461 A1* | 8/2012 | Sugimoto | H04N 5/23218 |
| | | | 348/349 |
| 2012/0300051 A1* | 11/2012 | Daigo | H04N 5/23245 |
| | | | 348/77 |
| 2017/0064192 A1* | 3/2017 | Mori | G06F 3/04845 |
| 2017/0366743 A1* | 12/2017 | Park | H04N 5/232127 |
| 2018/0348470 A1* | 12/2018 | Suzuki | G02B 7/09 |

* cited by examiner

IMAGING DEVICE

TECHNICAL FIELD

The present disclosure relates to an imaging device having an autofocus mode.

BACKGROUND ART

An autofocus mode is a mode in which focusing is performed by automatically adjusting a focus lens to a subject within an autofocus frame. For example, Patent Document 1 discloses an imaging device including a focus lens that adjusts an in-focus state of a subject, an operation unit that receives a user operation, and a drive unit that automatically drives the focus lens based on an operation of the operation unit.

The autofocus mode has a pre-autofocus function of adjusting a subject within an autofocus frame to an in-focus state without half-pressing a shutter button.

PRIOR ART DOCUMENTS

Patent Documents

Patent Document 1: Japanese Patent Laid-open Publication No. 2006-33437

SUMMARY OF THE INVENTION

Problems to be Solved by the Invention

When the autofocus frame is moved while the pre-autofocus function is being performed, a subject at a position where the autofocus frame has been moved is automatically focused. For this reason, when a desired subject does not yet exist in the destination autofocus frame, a focus position is adjusted to a different position, and even when the desired subject appears in the autofocus frame, it becomes necessary to adjust to an in-focus state again, which is troublesome for a user.

The present disclosure provides an imaging device with an increased number of options for focus adjustment by moving an autofocus frame.

Means for Solving the Problems

In one aspect of the present disclosure, an imaging device including:
an imaging unit that images a subject;
a display unit that displays a photographing image;
a display control unit that displays an autofocus frame for focusing on the subject in the photographing image of the display unit;
a shutter button for storing the photographing image;
a focus adjustment mechanism that focuses on the subject in the autofocus frame by half-pressing the shutter button;
a first operation unit for selecting a position of the autofocus frame at an arbitrary position in the photographing image;
a second operation unit for selecting the position of the autofocus frame at an arbitrary position in the photographing image; and
a control unit that determines whether or not to operate a pre-autofocus function according to a setting state in which the pre-autofocus function is set to be valid or invalid, the pre-autofocus function adjusting a position of a focus lens to focus on the subject in the autofocus frame, regardless of whether the shutter button is half-pressed or not,
wherein in the control unit,
when the position of the autofocus frame is changed using the first operation unit, the pre-autofocus function is operated regardless of the setting state, and
when the position of the autofocus frame is changed using the second operation unit, the pre-autofocus function is operated according to the setting state.

Effects of the Invention

According to the imaging device of the present disclosure, it is possible to provide an imaging device with an increased number of options for a user's imaging method by moving an autofocus frame.

BRIEF DESCRIPTION OF THE DRAWINGS

FIG. 8 is a flowchart showing a flow of photographing by the user when the pre-autofocus function is set to ON.

FIG. 9 is a diagram showing an example of the autofocus frame when the pre-autofocus function is set to ON.

FIG. 10 is a diagram showing an example of the autofocus frame when the pre-autofocus function is set to ON.

MODES FOR CARRYING OUT THE INVENTION

Hereinafter, embodiments will be described in detail with reference to the drawings as appropriate. However, detailed explanation more than necessary may be omitted. For example, detailed explanation of already well-known matters and redundant explanation on substantially the same configuration may be omitted. This is to avoid the unnecessary redundancy of the following description and to facilitate understanding by those skilled in the art. It is to be noted that the inventor(s) is/are intended to provide those skilled in the art with a sufficient understanding of the present disclosure with reference to the accompanying drawings and the following description and does/do not intend to limit a subject matter recited in the claims.

Embodiment

A digital camera in the present embodiment has a manual focus mode in which a focus lens is moved by a user's manual operation to adjust a focus (hereinafter referred to as "MF mode") and an autofocus mode in which the digital camera automatically moves the focus lens to an in-focus position to adjust the focus (hereinafter referred to as "AF mode").

In the AF mode, the focus is adjusted with respect to a distance measuring area within an autofocus frame (hereinafter referred to as "AF frame") displayed at a center of a photographing image displayed on a display unit. The digital camera in the present embodiment has a plurality of types of AF functions. A single AF function adjusts a subject in the AF frame located at the center of the photographing image to an in-focus state when a user half-presses a shutter button. In the single AF function, even when a direction of the digital camera is changed, the focus state remains unchanged if the shutter button is kept half-pressed.

In addition, a continuous AF function keeps adjusting so that the subject in the AF frame located at the center of the photographing image is always in focus as long as a user keeps half-pressing the shutter button. In the continuous AF function, the focus is adjusted so that the subject is always in focus even when a state of the subject in the AF frame changes, such as when the subject moves or when the camera is moved.

Further, a pre-AF function adjusts a focus so as to keep focusing on the subject in the AF frame displayed on the photographing image while the digital camera is turned on, even if a user does not half-press the shutter button. When the user holds the digital camera, the subject in the AF frame is in focus, so that photographing can be performed quickly.

In the present embodiment, the AF frame can be moved in the single AF function and the pre-AF function, and further, it is determined whether focus adjustment is performed or not according to a type of operation unit. A configuration of the digital camera will be described in detail below.

1. Digital Camera

Figure 1:
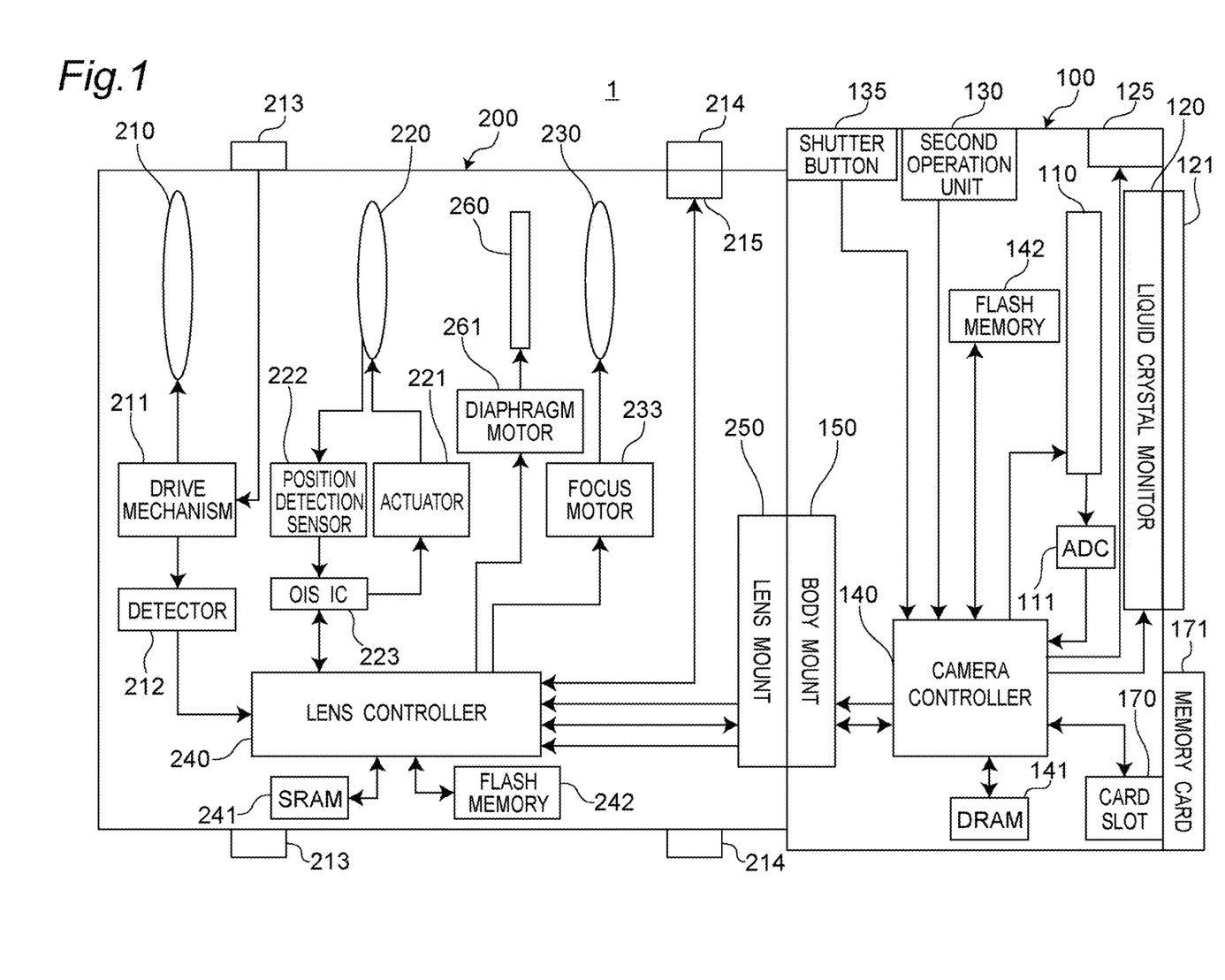
FIG. 1 is a diagram illustrating a configuration of a digital camera according to an embodiment of the present disclosure.

FIG. 1 is a diagram illustrating the configuration of the digital camera according to the present embodiment. As shown in FIG. 1, a digital camera 1 includes a camera body 100 and an interchangeable lens 200. The interchangeable lens 200 is provided with a focus ring 214 for a user to perform a focus operation. The user can manually perform the focusing operation by rotating the focus ring 214 in an MF mode. Hereinafter, a more detailed configuration of the camera body 100 and the interchangeable lens 200 will be described.

[1-1. Camera Body]

The camera body 100 includes a CMOS image sensor 110, a liquid crystal monitor 120, a touch panel 121, a finder 125, a shutter button 135, a camera controller 140, a body mount 150, and a card slot 170.

The camera controller 140 controls operation of the entire digital camera 1 including control of the CMOS image sensor 110 and the like according to an instruction from the shutter button 135. The camera controller 140 uses a DRAM 141 as a work memory during control operation and image processing operation. The camera controller 140 is an example of a control unit and a display control unit.

The CMOS image sensor 110 is an image sensor that captures a subject image incident through the interchangeable lens 200 and generates an analog image signal. The generated analog image signal is converted into digital image data by an AD converter (ADC) 111. The image data converted by the AD converter 111 is subjected to various image processing by the camera controller 140. Examples of various image processing include gamma correction processing, white balance correction processing, scratch correction processing, YC conversion processing, electronic zoom processing, and image compression processing such as JPEG compression processing. The CMOS image sensor 110 is an example of an imaging unit.

The CMOS image sensor 110 operates at a timing generated by the camera controller 140. The CMOS image sensor 110 captures a still image or a moving image, captures a through image, and the like. The through image is an image that is not recorded on a memory card 171 after being imaged. The through image is mainly a moving image, is displayed on the liquid crystal monitor 120 or the finder 125, and is referred to by the user to determine composition of the captured image.

The liquid crystal monitor 120 displays an image indicated by display image data subjected to the image processing by the camera controller 140. The liquid crystal monitor 120 can selectively display a moving image and a still image. Instead of the liquid crystal monitor 120, other types of rear displays such as an organic EL display may be used. The touch panel 121 is disposed on a surface of the liquid crystal monitor 120, and can receive a touch operation by a user. A through image is displayed on the liquid crystal monitor 120, and further, an autofocus frame 30 (hereinafter referred to as an AF frame 30) is displayed on the through image. The liquid crystal monitor 120 is an example of a display unit, and the touch panel 121 is an example of a first operation unit.

The finder 125 displays the image indicated by the display image data subjected to the image processing by the camera controller 140. The finder 125 can selectively display both a moving image and a still image. The finder 125 is, for example, a liquid crystal image display, but other types of display devices such as an organic EL display may be used. A through image is displayed on the finder 125, and further, the AF frame 30 is displayed on the through image. The finder 125 is an example of the display unit.

A second operation unit 130 includes an operation member for a user to perform instructions and settings to the digital camera 1. For example, the second operation unit 130 includes a cursor key, a jog dial, a joystick, and the like. The second operation unit 130 is preferably a physical key that is easy for the user to operate while looking through the finder 125, but may be a cursor key displayed on the liquid crystal monitor 120 instead of the physical key.

The shutter button 135 is a button that can detect two states of a half-pressed state and a fully-pressed state. The shutter button 135 is an operation member for focusing on the subject in the AF frame 30 in the half-pressed state and recording a through image on the memory card 171 as a photographed image in the fully-pressed state. A half-press signal is transmitted from the shutter button 135 to the camera controller 140 in the half-pressed state, and a fully-press signal is transmitted from the shutter button 135 to the camera controller 140 in the fully-pressed state.

The card slot 170 can be loaded with the memory card 171. The card slot 170 controls the memory card 171 based on the control from the camera controller 140. In other words, the image data generated by the image processing of the camera controller 140 is stored in the memory card 171. The memory card 171 can store various image files, for example, JPEG image files. In addition, image data or image files stored in the memory card 171 can be read out therefrom. The image data or image files read out from the memory card 171 is/are subjected to the image processing by the camera controller 140. For example, the camera controller 140 decompresses the image data or image files acquired from the memory card 171 and generates display image data.

The body mount 150 can be mechanically and electrically connected to a lens mount 250 of the interchangeable lens 200. The body mount 150 can send and receive data to and from the interchangeable lens 200 via the lens mount 250.

Note that, although not shown, the camera body 100 is provided with a mode switch for switching setting of the digital camera 1 between an AF (autofocus) mode and an MF (manual focus) mode. The mode switch outputs a switching signal to the camera controller 140 in accordance with a user operation. The camera controller 140 transmits a control signal for setting the focus mode in accordance with the switching signal to the lens controller 240. Thereby, the setting of the digital camera 1 can be switched between the AF mode and the MF mode.

[1-2. Interchangeable Lens]

The interchangeable lens 200 includes an optical system, a lens controller 240, and the lens mount 250. The optical system of the interchangeable lens 200 includes a zoom lens 210, an OIS lens 220, a diaphragm 260, and a focus lens 230.

The zoom lens 210 is a lens for changing magnification of a subject image formed by the optical system of the interchangeable lens 200. A drive mechanism 211 is a mechanism that moves the zoom lens 210 mechanically in conjunction with movement of a zoom ring 213 that can be rotated by a user. The drive mechanism 211 moves the zoom lens 210 along a direction of an optical axis of the optical system based on the operation of the zoom ring 213 by the user.

A first detector 212 detects movement or a driving amount of the zoom lens by the drive mechanism 211. The first detector 212 detects a position of the zoom ring 213, that is, a position of the zoom lens 210. The lens controller 240 can grasp zoom magnification in the optical system, the position of the zoom lens 210, and the position, a rotation amount, and a rotation speed of the zoom ring 213 by acquiring detection results of the first detector 212.

The OIS lens 220 is a lens for correcting blurring of a subject image formed by the optical system of the interchangeable lens 200. An actuator 221 receives control from an OIS IC 223 and drives the OIS lens 220 in a plane perpendicular to the optical axis of the optical system. A position detection sensor 222 is a sensor that detects a position of the OIS lens 220 in the plane perpendicular to the optical axis of the optical system. The OIS IC 223 controls the actuator 221 based on a detection result of the position detection sensor 222 and a detection result of a blur detector such as a gyro sensor.

The diaphragm 260 is a member for adjusting an amount of light passing through the optical system. The diaphragm 260 includes, for example, a plurality of diaphragm blades, and can adjust the amount of light by opening and closing an opening formed by the blades.

The focus lens 230 is a lens for changing a focus state of a subject image formed on the CMOS image sensor 110 by the optical system. The focus lens 230 is composed of one or a plurality of lenses.

A focus motor 233 drives the focus lens 230 to advance and retreat along the optical axis of the optical system based on the control of the lens controller 240. Thereby, the focus state of the subject image formed on the CMOS image sensor 110 by the optical system can be changed. In the present embodiment, a stepping motor is used as the focus motor 233. However, the focus motor is not limited to this, and may be constituted by, for example, a DC motor or an ultrasonic motor.

The focus ring 214 is an operation member provided on the exterior of the interchangeable lens 200 and receiving an operation (instruction) for moving the focus lens 230 from a user.

When the focus ring 214 is operated by the user, a second detector 215 detects an operation amount (a rotation amount) of the focus ring 214. The second detector 215 includes a photo interrupter. The photo interrupter detects the operation amount of the focus ring 214 and outputs an operation signal (a pulse signal) indicating the detected operation amount to the lens controller 240. Instead of the photo interrupter, the second detector 215 may include a sliding resistance that detects the operation amount of the focus ring 214.

The lens controller 240 controls the entire interchangeable lens 200 including control of the focus motor 233 based on the control signal from the camera controller 140. For example, in the AF mode, based on the control signal from the camera controller 140, the lens controller 240 controls the focus motor 233 so as to move the focus lens 230 forward and backward along the optical axis by a predetermined driving method (wobbling control). Alternatively, in the MF mode, the focus lens 230 is moved according to the operation of the focus ring 214 by the user, that is, a detection signal from the second detector 215. The lens controller 240 and the focus motor 233 are examples of a focus adjustment mechanism.

Further, the lens controller 240 receives a signal from the second detector 215 and transmits the signal to the camera controller 140. The lens controller 240 transmits and receives data to and from the camera controller 140 via the lens mount 250 and the body mount 150.

The lens controller 240 uses a SRAM 241 as a work memory. Further, a flash memory 242 stores programs and parameters used for control of the lens controller 240.

The camera controller 140 and the lens controller 240 execute programs to realize predetermined functions. Here, the program to be executed may be provided for the digital camera 1 by a recording medium such as a DVD-ROM or CD-ROM, or may be downloaded from a server on a network via a communication line. In addition, the functions of the camera controller 140 and the lens controller 240 are realized by cooperation of hardware and software (application program), but may be realized only by a hardware circuit designed specifically to realize a predetermined function. The camera controller 140 can be composed of not only a CPU or MPU, but also a DSP, FPGA, ASIC, or the like.

2. Focus Adjustment

As described above, in the AF mode, the focus lens 230 is driven according to the half-press operation of the shutter button 135, and a focus can be automatically adjusted. In other words, a half-press signal is transmitted from the shutter button 135 to the camera controller 140. When the camera controller 140 receives the half-press signal, the camera controller 140 transmits an automatic focus adjustment signal to the lens controller 240. When receiving the automatic focus adjustment signal, the lens controller 240 drives and controls the focus motor 233 to move the focus lens 230 to an in-focus position. However, the following problems occur when using the AF mode.

Figure 2:
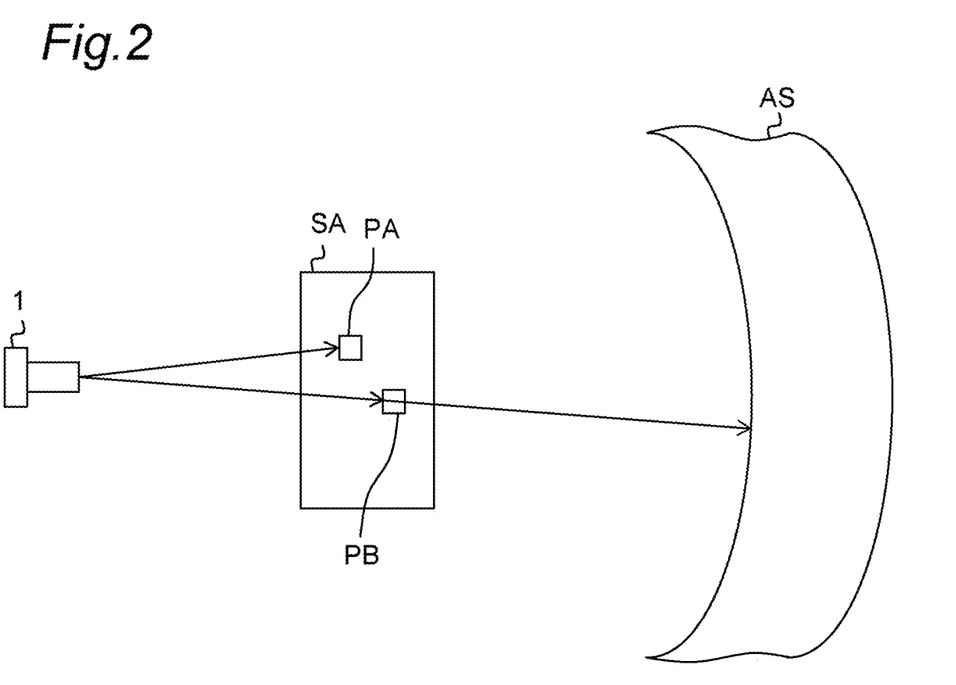
FIG. 2 is a diagram showing a change in focus target as an autofocus frame moves.
Figure 3:
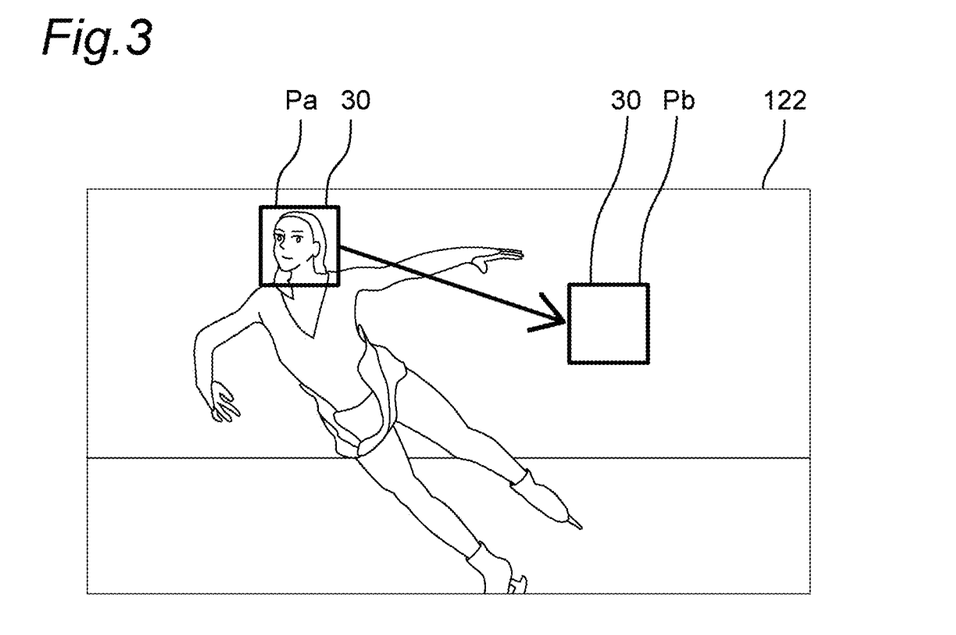
FIG. 3 is a diagram showing an example of moving the autofocus frame.

For example, when photographing an athlete at a competition venue, it is beneficial to use the pre-AF mode. A moving athlete is in focus just by setting him/her in the AF frame, so he/she can be photographed quickly. Hereinafter, problems that occur when the AF frame is moved in the pre-AF mode will be described with reference to FIGS. 2 and 3. FIG. 2 is a diagram illustrating a change in focus target as the AF frame moves. FIG. 3 is a diagram illustrating an example of moving the autofocus frame.

As shown in FIG. 2, there is a large space between a competition area SA where an athlete to be photographed exists and a background spectator stands AS. In such a situation, when the athlete is photographed using a lens with a long focal length, the focus is once adjusted at a position PA in the competition area SA. In this case, as shown in FIG. 3, for example, the AF frame 30 is moved to an arbitrary first position Pa on a through image 122. After this, in order to change a photographing position of the athlete with a camera position unchanged or to photograph another athlete, the AF frame 30 is moved to a position PB (a position of an arbitrary second position Pb on the through image 122). Since the subject does not exist yet, the focus is adjusted so as to focus on the background spectator stands AS. Therefore, the focus lens 230 is moved, and an in-focus state is changed. When the athlete returns to the AF frame 30, it is necessary to take time to adjust to an in-focus state again in which focusing is performed on the athlete who competes in the competition area SA from a state in which focusing is performed on the background spectator stands AS. Accordingly, there is a problem of missing a photo opportunity.

In order to solve the above problems, the digital camera 1 of the present embodiment has a menu that can be set to execution/non-execution of the pre-AF function. When the execution of the pre-AF function is set, the pre-AF function is executed after the AF frame 30 is moved. Further, when the non-execution of the pre-AF function is set, a focus state before the movement is maintained even after the AF frame 30 is moved.

Figure 4:
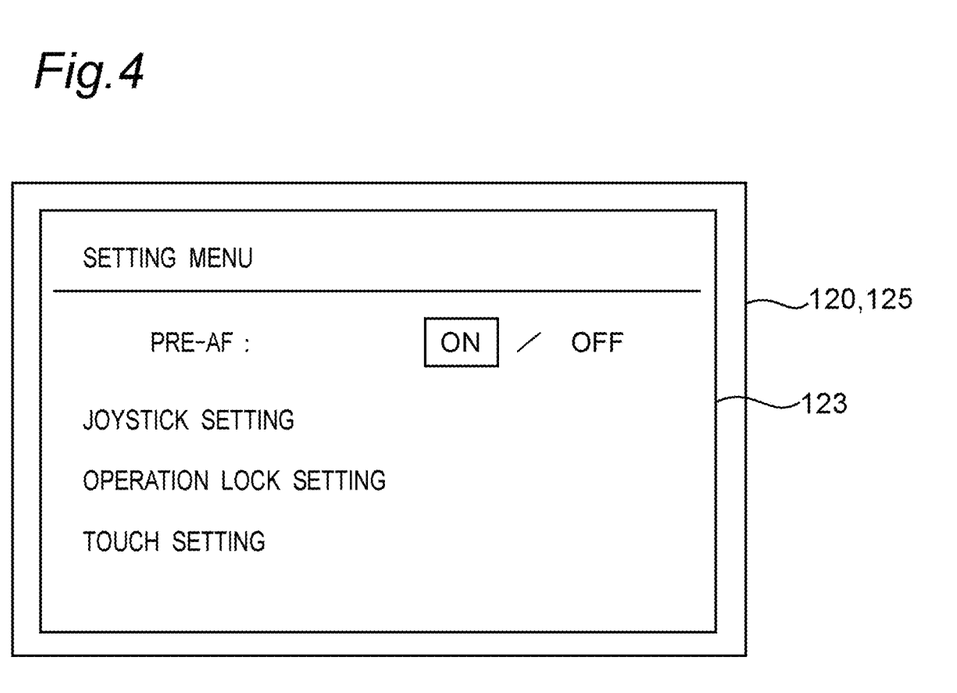
FIG. 4 is a diagram showing an example of a menu screen for setting a pre-autofocus function.

FIG. 4 is a diagram showing an example of a menu screen 123 for setting validity/invalidity of the pre-AF function. This menu screen 123 is displayed on the liquid crystal monitor 120 or the finder 125. On the menu screen 123, a user can set each item by operating a touch panel function or the second operation unit 130 such as a cursor key or a dial. On the menu screen 123, when a "Pre-AF" item is set to "ON", the pre-AF function is set to be valid (ON). When the "Pre-AF" item is set to "OFF", the pre-AF function is set to be invalid (OFF). Set information is recorded in a flash memory 142 by the camera controller 140.

When the pre-AF function is set to be valid, in the AF mode, changes are detected after adjusting the zoom lens 210, after panning the digital camera 1, after occurrence of blurring of the digital camera 1, and after moving the AF frame 30. The pre-AF function is then executed. Therefore, when the camera controller 140 detects these states, even if the user does not half-press the shutter button 135, the focus lens 230 is driven and focus adjustment is performed so as to automatically focus on the subject in the AF frame 30.

When the pre-AF function is set to be invalid, in the AF mode, even if the AF frame 30 is moved by the second operation unit 130, the focus lens 230 is not driven and the focus adjustment is not performed unless the user half-presses the shutter button 135. However, after the user moves the AF frame 30 on the through image displayed on the liquid crystal monitor 120 by a touch operation on the touch panel 121, even if the user does not half-press the shutter button 135, the focus lens 230 is driven and the focus adjustment is performed so as to automatically focus on the subject within the AF frame 30.

Figure 5:
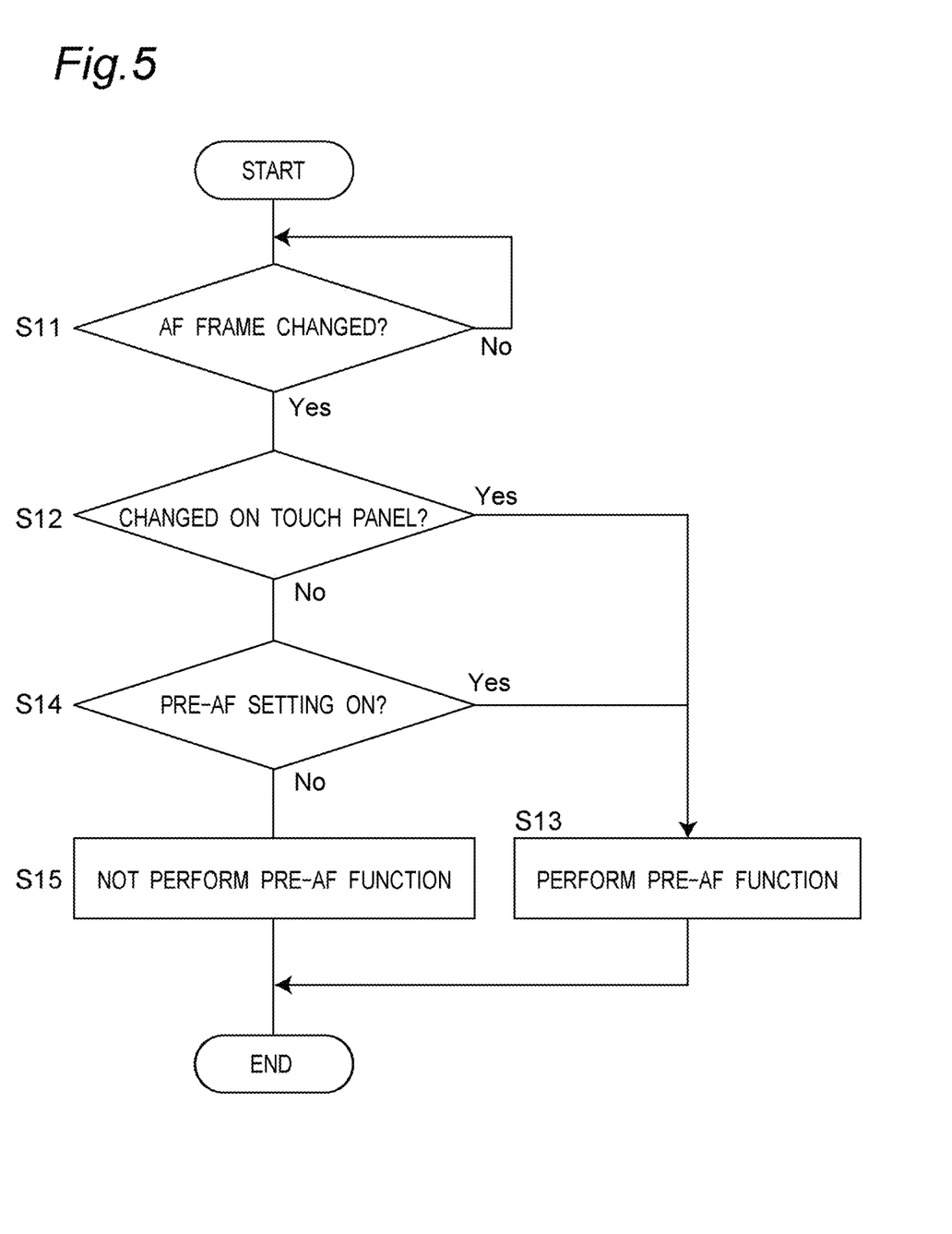
FIG. 5 is a flowchart showing processing of a camera controller that determines whether the pre-autofocus function is performed or not.

FIG. 5 is a flowchart showing processing of the camera controller that determines whether the pre-autofocus function is performed or not. Hereinafter, the processing in the flowchart of FIG. 5 will be described.

When the digital camera 1 is turned on, a through image is displayed on the liquid crystal monitor 120 or the finder 125, and further, the AF frame 30 is displayed on the through image. When a user operates the second operation unit 130 or touches the touch panel 121, the AF frame 30 is moved.

When the AF frame 30 is moved by the touch operation on the touch panel 121, according to a touch signal from the touch panel 121, the camera controller 140 directly moves the AF frame 30 from a first position before movement to a touched second position in the through image. When the AF frame 30 is moved by the operation by the second operation unit 130, according to an operation signal from the second operation unit, the AF frame 30 is continuously moved from the first position before the movement to the second position after the movement in the through image.

When the operation signal or the touch signal as a movement signal for moving the AF frame 30 is input, the camera controller 140 recognizes a change in position of the AF frame 30 (Yes in S11). When the movement signal of the AF frame 30 is not input, the position of the AF frame 30 is not changed (No in S11), so that the process returns to the first processing again.

When the position of the AF frame 30 is changed, the camera controller 140 determines whether the position of the AF frame 30 is changed on the touch panel 121. When it is changed by the touch operation on the touch panel 121 (Yes in S12), the camera controller 140 performs a pre-AF function (S13). Therefore, the lens controller 240 controls a position of the focus lens 230 so as to focus on a subject in the AF frame 30. In S12, when the position of the AF frame 30 is changed by the second operation unit 130, that is, when it is not changed on the touch panel 121 (No in S12), the camera controller 140 determines whether pre-AF setting recorded in the flash memory 142 is ON (S14). When the pre-AF setting is set to "ON" (Yes in S14), the camera controller 140 performs the pre-AF function (S13). In S14, when the pre-AF setting is set to "OFF", that is, when the pre-AF setting is not set to "ON" (No in S14), the camera controller 140 does not perform the pre-AF function (S15). Therefore, even after the AF frame 30 is moved, a focus state before the movement is maintained.

Figure 6:
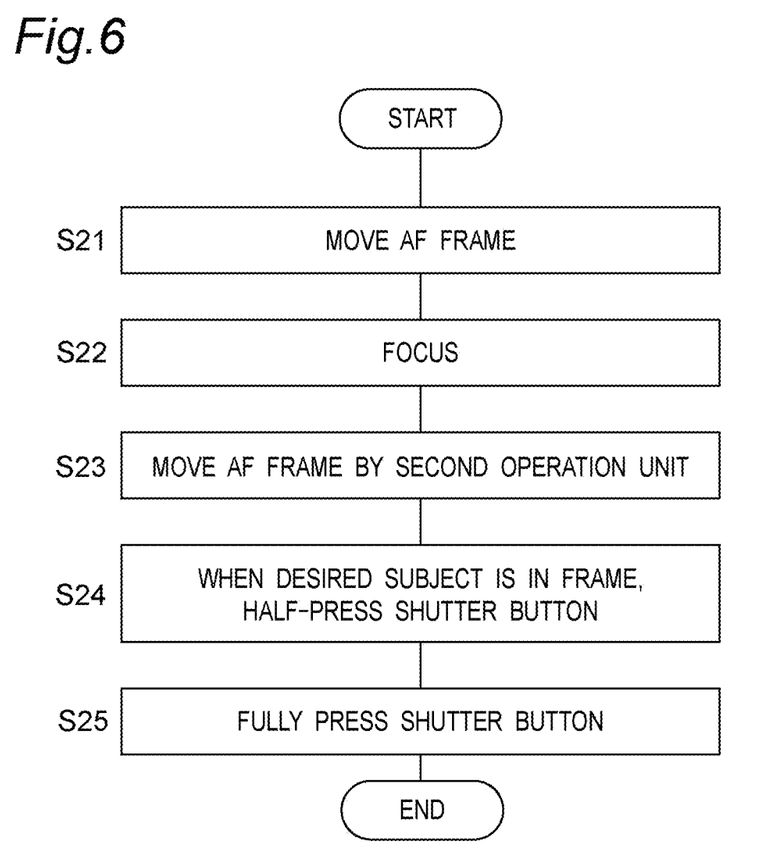
FIG. 6 is a diagram showing an example after the autofocus frame is moved.
Figure 7:
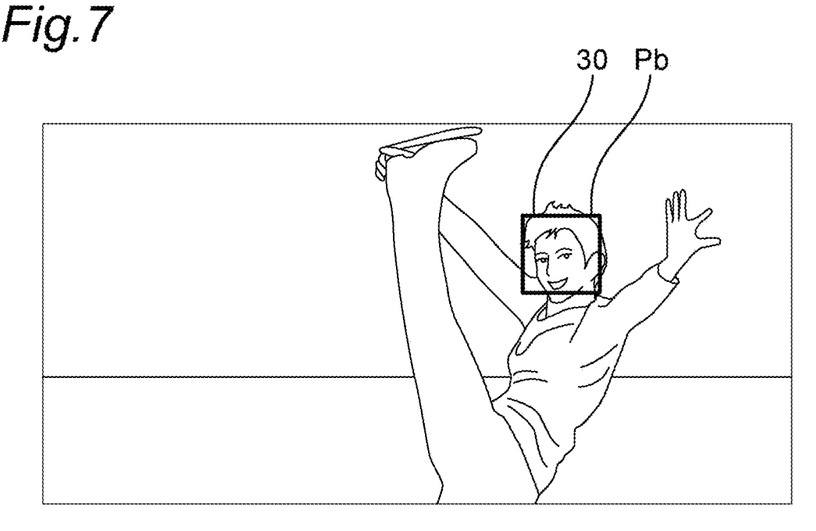
FIG. 7 is a flowchart showing a flow of photographing by a user when the pre-autofocus function is set to OFF.

With reference to FIGS. 3, 6, and 7, a photographing method in a state in which the pre-AF setting is "OFF" will be described. FIG. 6 is a flowchart showing a flow of photographing by a user when the pre-autofocus function is set to OFF. FIG. 7 is a diagram showing an example after the AF frame 30 is moved. First, in FIG. 3, in the state in which the pre-AF setting is "OFF", the user touches the touch panel 121 so that the AF frame 30 is at the first position Pa, or moves the AF frame 30 to the first position Pa by an operation of the second operation unit 130 (S21). When the touch panel 121 is touched, the AF frame 30 is directly moved to the first position Pa, and a subject in the AF frame 30 at the first position Pa is automatically focused (S22). When the AF frame 30 is moved by the operation of the second operation unit 130, the camera controller 140 continuously moves the AF frame 30 while an operation signal is sent from the second operation unit 130 (S21). For example, the user can operate the second operation unit 130 while looking through the finder 125. When the AF frame 30 is moved to the first position Pa, the user half-presses the shutter button 135 to focus on the subject in the AF frame 30 at the first position Pa (S22). When recording a through image at this time, the user fully presses the shutter button 135.

Next, the second operation unit 130 moves the AF frame 30 from the first position Pa to the second position Pb (S23).

Since the pre-AF setting is "OFF", even after the AF frame 30 is moved to the second position Pb, a focus state at the first position Pa is maintained. At this time, the subject in the AF frame 30 is the spectator stands AS. However, since an in-focus position is the position PA of the competition area SA, a defocused image is displayed on the finder 125 or the liquid crystal monitor 120.

Next, as shown in FIG. 7, when a desired subject is within the AF frame 30 at the second position Pb, the shutter button 135 is half-pressed to focus (S24). At this time, since a focal length is adjusted within the same competition area SA, that is, within a range where the position of the subject is close, it is possible to focus more quickly than when the focus is adjusted to the spectator stands AS. In addition, since the subject in the frame is generally in focus, it is possible to provide a through image that is easy to view, and not a through image that is greatly out of focus for the user. Next, when the user fully presses the shutter button 135 (S25), the focused through image can be recorded on the memory card 171.

Therefore, in the digital camera 1, when the pre-AF function is set to be invalid (OFF) in a setting state of the pre-AF function, even if the AF frame 30 focused at the first position Pa is moved to the second position Pb, the camera controller 140 maintains the focus state at the first position Pa. In addition, by inputting the half-press signal of the shutter button 135 when the desired subject is within the AF frame 30 at the second position Pb, the lens controller 240 adjusts the position of the focus lens 230 to be in an in-focus state.

In this way, when photographing is performed with the pre-AF function set to "OFF", even if there is no subject at a destination of the AF frame 30, the focus state before the movement is maintained. Accordingly, when the desired subject is imaged in the AF frame 30, it is possible to focus quickly. Further, this is particularly useful when the user wants to select the AF frame 30 that he/she wants to focus on a location other than a center of the through image.

Figure 8:
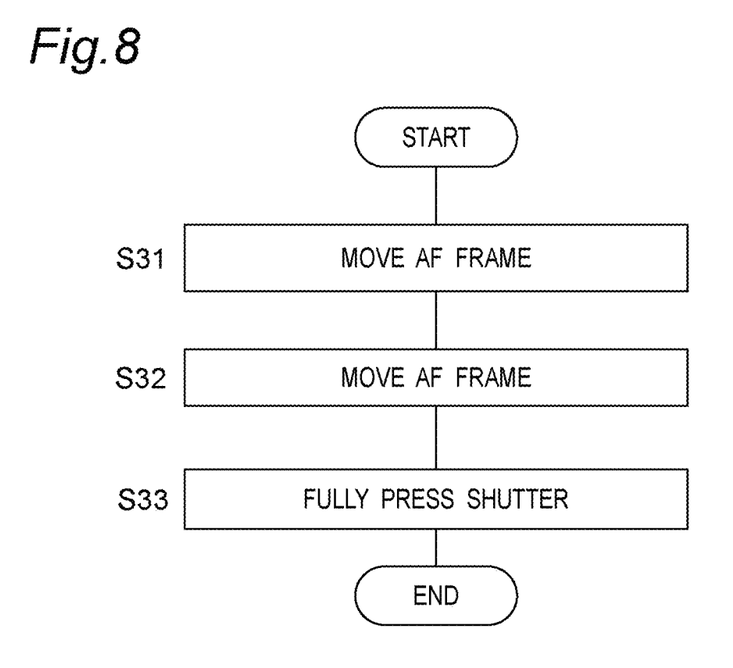
Figure 9:
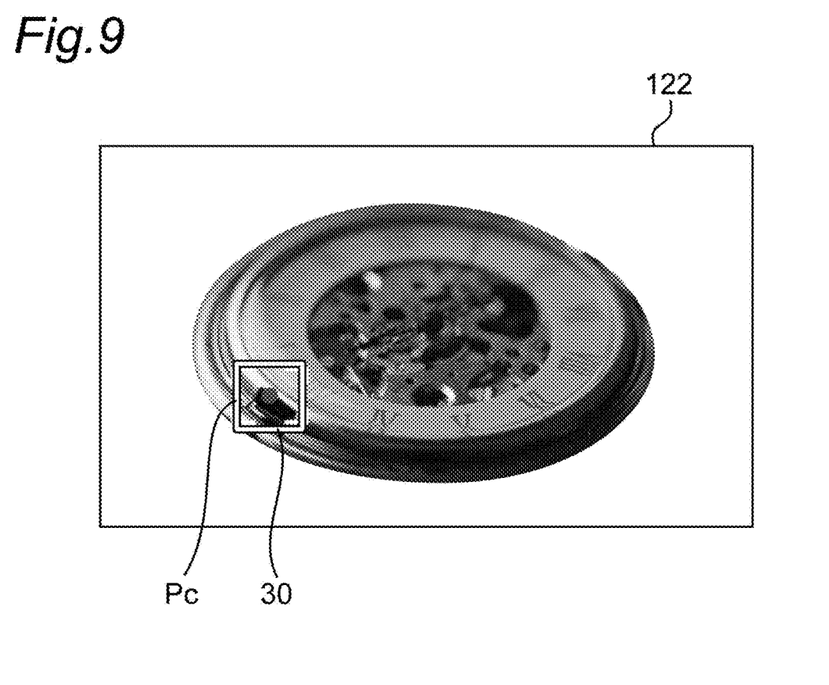
Figure 10:
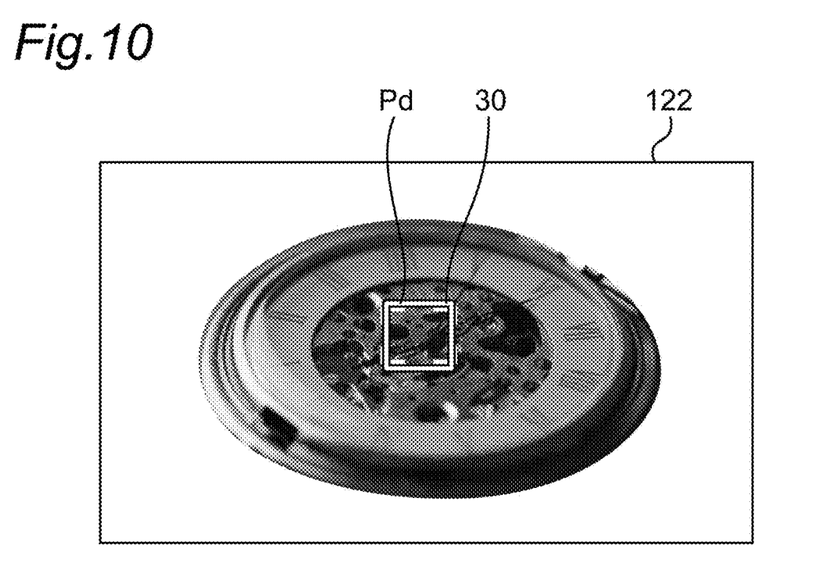

Next, with reference to FIGS. 8 to 10, a photographing method in a state in which the pre-AF setting is "ON" will be described. FIG. 8 is a flowchart showing a flow of photographing by a user when the pre-autofocus function is set to ON. FIGS. 9 and 10 are diagrams each showing an example of the AF frame 30 when the pre-autofocus function is set to ON.

First, in FIG. 9, in the state in which the pre-AF setting is "ON", a user touches the touch panel 121 so that the AF frame 30 is at a position Pc, or moves the AF frame 30 to the position Pc by an operation of the second operation unit 130 (S31). When the touch panel 121 is touched, the camera controller 140 and the lens controller 240 automatically focus on a subject in the AF frame 30 at the position Pc. When the AF frame is moved by the operation of the second operation unit 130, for example, even when the user operates the second operation unit 130 while looking through the finder 125, the camera controller 140 and the lens controller 240 automatically focus on the subject in the AF frame 30 at the position Pc. When recording a through image at this time on the memory card 171, the user fully presses the shutter button 135.

Next, by touching the touch panel 121 or by operating the second operation unit 130, the AF frame 30 is moved from the position Pc to a position Pd (S32). Since the pre-AF setting is "ON", regardless of which operation is performed for the movement, the camera controller 140 and the lens controller 240 automatically focus on the subject in the AF frame 30 at the position Pd. Next, when the user fully presses the shutter button 135, a through image focused on the subject at the position Pd can be immediately recorded on the memory card 171 (S33).

When the pre-AF setting is "ON", by moving the AF frame 30 while keeping a composition of the entire image constant, the user can immediately confirm which part of the subject should be focused. For example, when there are multiple candidate locations desired to be focused on a subject that is always present in a frame, when focusing is performed along with movement of the AF frame 30 to each location, a user can immediately confirm whether the location matches an image he/she wants to photograph. In addition, when the focusing is always performed along with the movement of the AF frame, it is possible for the user to continue to look at a focused image and to reduce a burden on eyes.

As described above, a digital camera 1 according to the present embodiment is an imaging device including a CMOS image sensor 110 that captures an image of a subject, and a liquid crystal monitor 120 or a finder 125 that displays a through image 122. The digital camera 1 includes a camera controller 140 that displays an AF frame 30 for focusing on the subject in the through image 122 of the liquid crystal monitor 120 or the finder 125, and a shutter button 135 for storing the through image. The digital camera 1 includes a lens controller 240 and a focus motor 233 that focus on the subject in the AF frame 30 by half-pressing the shutter button 135. The digital camera 1 has a touch panel 121 for selecting a position of the AF frame 30 at an arbitrary position in the through image 122, and a second operation unit 130 for selecting the position of the AF frame 30 at the arbitrary position in the through image 122. The digital camera 1 includes the camera controller 140 that determines whether or not to operate a pre-AF function according to a setting state in which the pre-AF function is set to be valid (ON) or invalid (OFF). The pre-AF function adjusts a position of a focus lens 230 to focus on the subject in the AF frame 30, regardless of whether the shutter button 135 is half-pressed or not. In the camera controller 140, when the position of the AF frame 30 is changed using the touch panel 121, the pre-AF function is operated regardless of the setting state, and when the position of the AF frame 30 is changed using the second operation unit 130, the pre-AF function is operated according to the setting state.

According to the above digital camera 1, when the AF frame 30 is moved by the second operation unit, whether to focus on the subject in the AF frame 30 after the AF frame 30 is moved can be set according to the setting state of the pre-AF function. Further, even when the pre-AF function is set to be invalid, when the AF frame 30 is moved by operating the touch panel 121, the subject in the AF frame 30 is automatically focused. In this way, the digital camera 1 can be provided with more focus adjustment options by moving the AF frame 30, and autofocus adjustment can be performed in accordance with photographing conditions and user preferences.

Other Embodiments

As described above, the above embodiment has been described as an example of the technique disclosed in the present application. However, the technique in the present disclosure is not limited to this, and can also be applied to embodiments in which changes, substitutions, additions, omissions, etc. are made as appropriate. In addition, it is also possible to combine the respective components described in the embodiment to form a new embodiment. Therefore, other embodiments will be exemplified below.

In the above embodiment, the touch panel 121 and the second operation unit 130 are shown as examples of the operation unit for setting ON/OFF of the pre-AF function, but the operation unit is not limited thereto. The operation unit may be, for example, a physical switch, button, or dial dedicated to setting the pre-AF function disposed on the camera body 100.

In the above-described embodiment, the digital camera capable of exchanging lenses has been described as an example of an imaging device. However, the imaging device may be an integrated lens and body.

Although the above-described digital camera has been described as an example of the imaging device, an idea of the present disclosure can be applied to other types of imaging devices. In other words, the idea of the present disclosure can be applied to any imaging device that includes an operation member for a focus operation.

In the above embodiment, the CMOS image sensor is exemplified as the imaging unit, but the imaging unit is not limited to this. The imaging unit may be another type of image sensor, for example, a CCD image sensor or an NMOS image sensor.

As described above, the embodiments have been described as examples of the technique in the present disclosure. To that end, the accompanying drawings and the detailed description are provided.

Accordingly, some of the components described in the accompanying drawings and the detailed description may include not only essential components for solving the problem but also components which are not essential for solving the problem in order to exemplify the technique. For this reason, it should not be immediately recognized that those nonessential components are essentials, even when those nonessential components are described in the accompanying drawings and the detailed description.

In addition, since the above-described embodiments are intended to exemplify the technique in the present disclosure, it is possible to make various changes, replacements, additions, omissions, etc. within the scope of claims or the equivalent thereof.

INDUSTRIAL APPLICABILITY

The present disclosure is useful for an imaging device capable of adjusting an in-focus state via an operation member that operates a focus lens.

DESCRIPTION OF REFERENCE CHARACTERS

1 Digital camera
30 Autofocus frame
110 CMOS image sensor
120 Liquid crystal monitor
121 Touch panel
122 Through image
125 Finder
130 Second operation unit
135 Shutter button
140 Camera controller
230 Focus lens
233 Focus motor
240 Lens controller

The invention claimed is:

1. An imaging device comprising:
an imaging unit that images a subject;
a display unit that displays a photographing image;
a display control unit that displays an autofocus frame for focusing on the subject in the photographing image of the display unit;
a shutter button for storing the photographing image;
a focus adjustment mechanism that focuses on the subject in the autofocus frame by half-pressing the shutter button;
a first operation unit for selecting a position of the autofocus frame at an arbitrary position in the photographing image;
a second operation unit for selecting the position of the autofocus frame at an arbitrary position in the photographing image; and
a control unit that determines whether or not to operate a pre-autofocus function according to a setting state in which the pre-autofocus function is set to be valid or invalid, the pre-autofocus function adjusting a position of a focus lens to focus on the subject in the autofocus frame, regardless of whether the shutter button is half-pressed or not,
wherein in the control unit,
when the position of the autofocus frame is changed using the first operation unit, the pre-autofocus function is operated regardless of the setting state, and
when the position of the autofocus frame is changed using the second operation unit, the pre-autofocus function is operated according to the setting state.

2. The imaging device according to claim 1, wherein
in the display control unit,
according to an operation signal from the first operation unit, the autofocus frame is directly moved from a first position to a second position in the photographing image, and
according to an operation signal from the second operation unit, the autofocus frame is continuously moved from the first position to the second position in the photographing image.

3. The imaging device according to claim 1, wherein
the display unit has a rear display and a finder,
the first operation unit is a touch panel, and
the second operation unit is a joystick or a cursor key.

4. The imaging device according to claim 1, wherein
when the pre-autofocus function is set to be invalid in the setting state,
even when the autofocus frame focused at the first position is moved to the second position, the control unit maintains a focus state at the first position, and
by inputting a half-press signal of the shutter button when a desired subject is within the autofocus frame at the second position, the focus adjustment mechanism adjusts the position of the focus lens to be in an in-focus state.

\* \* \* \* \*